United States Patent [19]

Nunn

[11] Patent Number: 5,257,843
[45] Date of Patent: Nov. 2, 1993

[54] PIVOTABLE SHEET CARRIER

[76] Inventor: William G. Nunn, 3535 Cottontail La., Casper, Wyo. 82604

[21] Appl. No.: 865,279

[22] Filed: Apr. 8, 1992

[51] Int. Cl.$^5$ .................. B65G 7/12; B66F 11/00
[52] U.S. Cl. ...................... 294/15; 294/26; 294/902
[58] Field of Search ............ 294/15, 17, 26, 32, 294/167, 168, 169, 902

[56] References Cited

U.S. PATENT DOCUMENTS

| | | | |
|---|---|---|---|
| 958,923 | 5/1910 | Jensen | 294/15 |
| 2,428,941 | 10/1947 | Packard | 294/15 X |
| 4,098,442 | 7/1978 | Moore | 294/141 |
| 4,113,160 | 9/1978 | Spiers | 294/15 X |
| 4,215,889 | 8/1980 | Rayburn | 294/902 X |
| 4,657,295 | 4/1987 | Holem | 294/169 X |
| 4,695,085 | 9/1987 | Cassels | 294/15 |
| 5,069,495 | 12/1991 | Mears | 294/15 |

FOREIGN PATENT DOCUMENTS 3431400 2/1986 Fed. Rep. of Germany ........ 294/15

Primary Examiner—David M. Mitchell
Assistant Examiner—Dean J. Kramer
Attorney, Agent, or Firm—Risto A. Rinne, Jr.; Douglas M. Clarkson

[57] ABSTRACT

An apparatus for the hand held transportation of sheet materials on either level or inclined surfaces while maintaining control over such sheets. A handle or shoulder strap is connected pivotally to a sheet support at a particularly specified point, which ensures that the sheet support pivots readily on inclined surfaces. The point that is specified is as low as possible on the sheet support.

12 Claims, 2 Drawing Sheets

PIVOTABLE SHEET CARRIER

BACKGROUND OF THE INVENTION

1. Field of the Invention

The present invention, in general, relates to apparatus for use in the handling and transportation of materials and, more particularly, to hand held apparatus to transport sheet materials.

The transportation of sheet material by hand is often limited more by the bulk and geometry of the material than by its weight. Consequently, an individual is able of carry the weight of most sheet material, such as plywood, wallboard and the like, but finds it difficult to maneuver while holding such materials.

Present sheet carriers provide some assistance when transporting sheet material on level surfaces. However, when sheet material is moved on stairs or on inclined surfaces, such as ramps, prior carriers can cause the sheet material to slide or tilt so that it is being supported only by an edge. Therefore, the potential is present for either an upset or damage to the sheet material being transported.

Accordingly, there exists a need for a sheet carrier that is better suited to the transportation and stable handling of sheet material of all types, both on level surfaces and when either ascending or descending from one level surface to another.

2. Description of Prior Art

Hand held sheet carriers are known. For example, U.S. Pat. No. 4,098,442 to Moore, that issued Jul. 4, 1978, describes a carrier for transporting sheets and includes a handle, an elongated member connected to the handle, and a panel receiving ledge connected to the elongated member.

U.S. Pat. No. 4,113,160 to Spiers, that issued Sep. 12, 1978, describes an adjustable hand held carrier for large sheets with two pieces joined by a fastener through slots in the ends of the carrier.

U.S. Pat. No. 4,135,655 to Brown, that issued Jan. 23, 1979, describes a carrier having a member that clamps the edges of sheet material under a spring tension.

U.S. Pat. No. 4,630,838 to Stockton, that issued Dec. 23, 1986, describes a carrier, including a handle connected to an elongated bar upon which sheet material is placed.

U.S. Pat. No. 4,695,085 to Cassels, that issued Sep. 22, 1987, describes a hand held sheet carrier having a pair of rigid plate components that are interconnected pivotally.

While the structural arrangement of some prior apparatus, at first appearance, have similarities with the present invention, they differ in material respects. These differences, which will be described in more detail hereinafter, are material for the effective use of the invention and which admit of the advantages that are not available with prior apparatus.

OBJECTS AND SUMMARY OF THE INVENTION

It is an important object of the present invention to provide a hand held sheet carrier that is convenient to use on level terrain.

It is also an object of the invention to provide a hand held sheet carrier that is convenient to use on inclined surfaces or when going up or down stairs.

Another object of the invention is to provide a hand held sheet carrier that resists having the sheet material fall from the sheet supporting surface of the carrier when transporting sheet materials on inclined surfaces or when going up or down stairs.

Briefly, a pivotable sheet carrier apparatus that is constructed in accordance with the principles of the present invention has a handle with pivotal interconnections as low as possible to a sheet support surface. By this arrangement, several controls are available over the geometry and weight of a sheet being handled. The capability of the sheet support surface to pivot, while maintaining contact with the sheet material being transported, over a wide range of transport attitudes provides one control. Then, means to limit the pivoting motion provides another control, and a third control is permitted due to this arrangement by a guiding action of the hand of an individual using the sheet carrier apparatus of the invention.

The above and other objects, features and advantages of the present invention will become more readily apparent from the following detailed description of the presently preferred embodiment.

BRIEF DESCRIPTION OF THE DRAWINGS

The present invention will be described with reference to the accompanying drawings, in which.

DETAILED DESCRIPTION OF THE INVENTION

Figure 1:
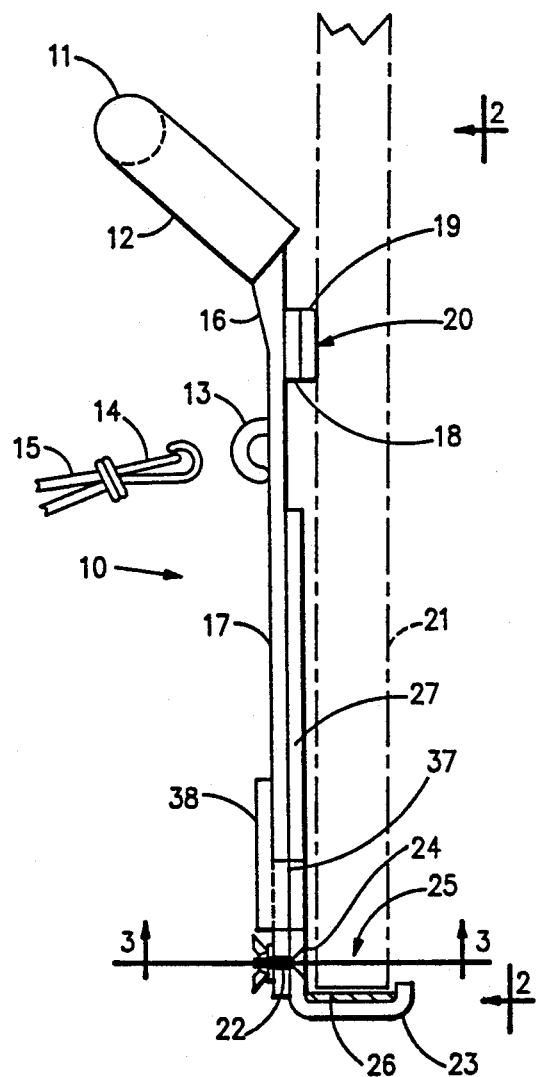
FIG. 1 is a side view in elevation of the controllable sheet carrier of the invention.
Figure 2:
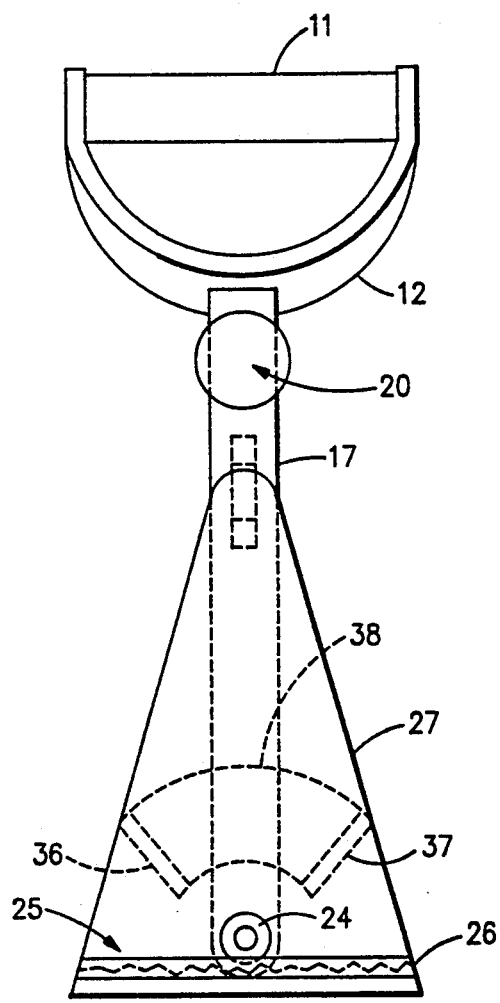
FIG. 2 is a front view in elevation of the controllable sheet carrier of the invention, taken along line 2—2 in FIG. 1.

Referring now to the drawings and in particular to FIG. 1 and to FIG. 2, a new and improved controllable sheet carrier is identified generally by the numeral 10. A handle 11 is attached intermediate two ends of an arcuate support 12.

Of course, the handle 11 is only one form of support for the sheet carrier 10 of the invention. An eyelet 13 is located just below arcuate support 12 of the handle 11 for engaging a hook 14 to attach a strap 15 to fit over the shoulder of a user so that both hands are free.

The handle support 12 is attached to an enlarged, upper end 16 of an elongated bar 17 formed of a light weight, relatively strong material, such as aluminum or wood. The end 16 provides greater structural integrity and the ability to sustain without damage the bending forces at the interface between the elongated bar 17 and the handle support 12.

A protrusion 18 is attached to the bar 17 near the enlarged end 16 with a smooth, non-abrasive surface 19 forming a bumper 20 between a sheet material 21 being handled and the protrusion 18. The bumper 20 prevents the surface of the sheet 21 from being marred, and also, the use of a non-elastic material for the bumper surface 19 ensures that a cadence arising from the gait of a user does not create a harmonic motion that could possibly be transmitted to the sheet 21.

A principal reason for using a non-elastic and rigid bumper and protrusion material is: a harmonic and/or rhythmic motion that is induced by the cadence of the gait of a user could accumulate compressive energy, which can produce periodic compression and expansion in a bumper and a protrusion, both of which could produce bounce and chatter in the sheet 21 being handled.

The length of the protrusion 18 forming the bumper 20 are selected also to provide ample clearance between the sheet 21 and the handle support 12 to ensure that the sheet is unable to make contact with any part of the support 12. By choosing the length of the bumper 20 carefully, such as by selecting an effective angle of attachment for the support 12 away from the bar 17, sufficient clearance is provided between the knuckles of a user's hand and the surface of the sheet 21 being carried.

A clearance opening 22 is formed in the elongated bar 17 at the end opposite the handle 11. The opening 22 permits attachment of an interconnection between the bar 17 and a sheet support 23.

In FIG. 2, the support 23 is shown with a hole 24. The sheet support 23 is formed of a generally triangular shaped rigid ledge plate 27 having a channel 25 with its U-shaped opening facing upwardly to receive the edge of the sheet 21 being transported.

The channel 25 is provided to receive, support and retain the lower edge of the sheet 21 to maintain the sheet in a substantially upright position. The hole 24 is located as low as possible in the support 23, as close as possible to bottom of the upturned, U-shaped channel 25.

A pad 26 with surface irregularities is attached by adhesive to the bottom of the channel 25 and provides both a static and a dynamic non-skid surface because of its high coefficient of friction.

For a majority of the time while the carrier 10 is in use, it is being held in a substantially level position. In this position, the triangular shape of the ledge plate 27 bears fully upon the elongated bar 17, thereby providing a maximal amount of support for the sheet 21.

The result is that contact by the plate 27 with the elongated bar 17 in the level position adds reinforcement to the bar 17, and as a result, keeps the bar 17 from bending should the sheet 21 be bumped or otherwise moved suddenly.

Figure 3:
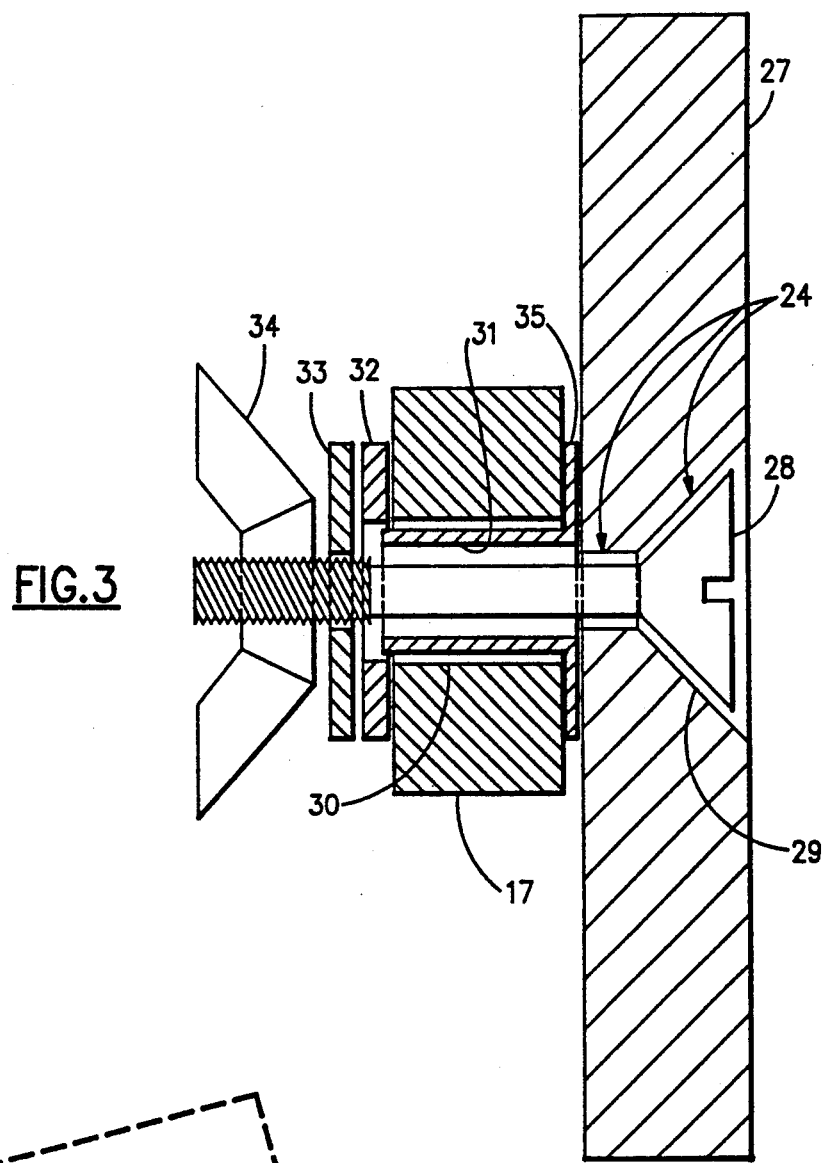
FIG. 3 is an enlarged view in cross section of the device to control a pivotal interconnection between the handle and the pivotable sheet carrier surface, taken along a line 3—3 in FIG. 1.

The fastening structure in FIG. 3 is that by which the plate 27 is connected pivotally to the bar 17. The hole 24 in the plate 27 is countersunk at the surface of the plate that is furthest from the bar 17 and closest to the sheet 21.

A screw 28 passes through the hole 20 and is recessed within the countersink 29 in the plate 27 sufficient to ensure that the screw 23 does not protrude beyond the surface of the plate where it would otherwise mar the sheet being carried.

The diameter of the hole 30 in the elongated bar 17 is larger than the smallest diameter of the plate hole 24. As a result, a sleeve bushing 31 passes over the screw 28, through the hole 30, and abuts against the plate 27.

A leather washer 32 having an inside diameter sufficient to clear the outside diameter of the sleeve bushing 31 is placed over the screw 28 and over the sleeve bushing 31 eventually to bear directly against the elongated bar 17.

A metal washer 33, having an inside diameter smaller than that of the sleeve bushing 31 but larger than that of the screw 28, is placed over the screw 28 to bear against the leather washer 32. A wing nut 34 is threaded on the screw 28 and is tightened to supply a compressive force upon the metal washer 33, the leather washer 32 and the sleeve bushing 31.

The sleeve bushing 31 has a greater length than the thickness of the elongated bar 17. Consequently, by tightening the wing nut 34, the metal washer 33 cannot be made to force the elongated bar 17 to bear against the plate 27. However, the compression of the leather washer 32 transfers the compressive force as supplied by a tightening of the wing nut 34, causing the bar 17 to bear against the plate 27.

As a result, the thickness selected for the leather washer 32 provides a method of influencing the force by which the elongated bar 17 will bear against the plate 27. A thicker leather washer 32 causes the bar 17 to bear against the plate 27 with greater force, and thereby, a greater tension between the two produces a stiffer pivotal interconnection between the bar 17 and the plate 27 for more control over the pivoting capability.

Conversely, a thinner leather washer 32 causes the bar 17 to bear against the plate 27 with less force, and a softer and easier pivotal interconnection between the bar 17 and the plate 27 is thus obtained.

The thickness and the elasticity of the leather washer 32 determine the tension between the bar 17 and the plate 27, and therefore, the relative ease or difficulty by which the pivotal connection between the bar 17 and the plate 27 is made. The use of materials other than leather for the washer 32 is foreseen, but any such materials should have characteristics similar to leather for the transference of compressive forces between the plate 27 and the bar 17.

A shim washer 35 is placed over the sleeve bushing 31 to provide an intermediate surface between the bar 17 and the plate 27 to reduce friction, prevent wear, and improve the consistency of the pivotal connection between the bar 17 and the plate 27 when the carrier 10 is specifically fabricated of certain materials, such as of aluminum or other soft metals.

Referring back to FIG. 1 and also to FIG. 2, two pivot stops 36 and 37 extend from the plate 27 at predetermined spaced apart locations. These pivot stops extend from the same surface of the plate 27 that is in contact with the bar 17, and they protrude a distance that is greater than the thickness of the bar 17.

Each pivot stop thereby serves to limit the maximum range of pivotal motion by the bar 17 relative to the plate 27 to a range of motion that is confined to that permitted within the two pivot stops 36 and 37. This prevents the plate 27 and the sheet 21 from excessive tilting, thereby providing more stability for the carrier 10 of the present invention.

A pivot strap 38 is fixedly attached to each of the pivot stops 36 and 37 and extends, in a planar arch, atop one pivot stop to atop the other pivot stop, to form a planar surface elevated from the planar surface of the plate 27 by an amount slightly greater than the thickness of the bar 17. The bar 17 is placed intermediate the elevated pivot strap 38 and the planar surface of the plate 27, wherein the bar 17 is secured in a position of cooperation substantially with the planar surface of the plate 27.

Figure 4:
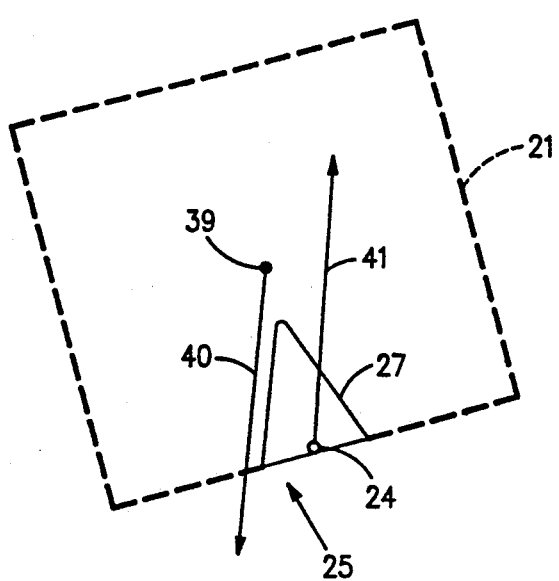
FIG. 4 is a view of a diagram to illustrate the forces involved and the resultant position obtained by the pivotable sheet support surface of the invention when carrying sheet material on an inclined surface.

In FIG. 4, the plate 27 is shown supporting the sheet 21. The center of gravity 39 of the sheet 21 is its geometric center, and therefore, the weight of the sheet is indicated at this center by the arrow 40. The sheet 21 is being transported on an inclined surface, such as a flight of stairs or a ramp.

According to the invention, the force exerted by a user of the carrier 10 holding onto the handle 11, or using the strap 15, is indicated by the arrow 41, and this force is concentrated at the hole 24. Since the hole 24 is contiguous with the channel 25, according to the invention, the plate 27 tends to rotate readily, but controllably, while maintaining contact with the bottom edge of the sheet 21 along substantially its entire length.

The geometry of the carrier 10, according to a principal feature of the invention, ensures that the bottom edge of the sheet material 21 is in contact with substantially the entire length of non-skid surface 26 to prevent the sheet 21 from sliding relative to the carrier 10.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A sheet carrying apparatus for hand held transport of substantially upright sheet materials such as plywood, wallboard, panelling, glass, and the like, comprising:

an elongated bar section with a handle means fixedly attached to one end thereof;

said handle means comprised of a grab handle means intermediately attached to each end of an arch structure;

said arch structure fixedly attached to said one end thereof of said elongated bar thereby providing an angled offset to said handle means away from said elongated bar section;

said elongated bar having a reinforced and enlarged area at said one end thereof thereby forming a gusset;

said gusset provided to attach said arch structure of said handle means thereto and to provide increased structural integrity to said elongated bar where attached to said arch structure;

said elongated bar section having an opening at the opposite end of said end having said handle means;

said opening provided to accept fastening means thereinto;

said fastening means provided to pivotally interconnect said opposite end of said elongated bar to a ledge plate;

said ledge plate being substantially triangular in shape and having a substantially U-shaped formed channel located at the base of said triangular shaped ledge plate for receiving, supporting and retaining one edge of said sheet material;

said ledge plate having a lower opening located as close as is mechanically possible to a bottom planar surface that is formed by said U-shaped formed channel located at said base of said triangular shaped ledge plate;

said lower opening provided to accept said fastening means; and said fastening means provided to pivotally interconnect said ledge plate to said opposite end of said elongated bar;

whereby said ledge plate is able to pivot with respect to said elongated bar and whilst so doing, to maintain said one edge of said sheet material substantially in a position of support contact and cooperation with said U-shaped formed channel located at the base of said triangular shaped ledge plate during transport of said sheet material intermittently upon inclined surfaces.

2. The sheet carrying apparatus of claim 1 wherein said substantially U-shaped channel has a non-skid surface attached to said bottom planar surface for retaining said one edge of said sheet material in a position of cooperation with said non-skid surface.

3. The sheet carrying apparatus of claim 2 wherein said non-skid surface means includes a non-skid strip means having non-skid means on one surface and having adhesive means on the remaining surface thereof, and said adhesive means to secure said non-skid surface means to said bottom planar surface of said substantially U-shaped formed channel.

4. The sheet carrying apparatus of claim 2 wherein said non-skid surface means includes surface irregularities formed in said bottom planar surface of said substantially U-shaped formed channel.

5. The sheet carrying apparatus of claim 1 wherein said elongated bar includes a fixedly attached rigid protrusion means near to where said arch structure is fixedly attached to and extending laterally from said one end thereof sufficiently far to prevent contact by said sheet material with said arch structure, said rigid protrusion means being of non-elastic composition means and having a substantially smooth, rigid, and non-abrasive surface means thereof, whereby said surface means permits said rigid protrusion means to slide along the face of said sheet material as said sheet carrying apparatus is used to transport said sheet material intermittently between level and inclined surfaces.

6. The sheet carrying apparatus of claim 1 wherein said fastening means includes a compressible washer of a predetermined thickness is used to provide, in cooperation with a screw means, tension between said elongated bar and said ledge plate to create a desired resistance to the pivotal interaction of said ledge plate with respect to said elongated bar.

7. The sheet carrying apparatus of claim 6 wherein said compressible washer is made of leather.

8. The sheet carrying apparatus of claim 6 wherein said fastening means includes a shim washer over said screw means intermediate between said elongated bar and said ledge plate.

9. The sheet carrying apparatus of claim 1 including pivot limiting means whereby the pivotal range of motion of said elongated bar is limited by the placement of said pivot limiting means so as to allow a pivotal range of motion by said elongated bar with respect to said ledge plate that is less than full circle.

10. The sheet carrying apparatus of claim 9 wherein said pivot limiting means includes two protrusions upon said ledge plate at predetermined spaced apart locations laterally extending away from the surface of said ledge plate that is in contact with said elongated bar sufficiently far so as to interfere with said pivotal motion of said elongated bar with respect to said ledge plate thereby limiting said pivotal motion to a range confined within said two protrusions.

11. The sheet carrying apparatus of claim 1 wherein said fastening means is located to maintain said elongated bar in a position of cooperation with said ledge plate.

12. The sheet carrying apparatus of claim 11 wherein said fastening means includes a pivot strap means elevated above the surface of said ledge plate wherein said pivot strap means provides an elevated planar surface with respect to said surface of said ledge plate whereby a portion of said elongated bar is situated therein thereby ensuring that said elongated bar is maintained in a position of cooperation with said ledge plate surface by said retaining means.

* * * * *